United States Patent [19]
Harris et al.

[11] Patent Number: 5,517,215
[45] Date of Patent: May 14, 1996

[54] MULTIPLE RESOLUTION FLYING SPOT RASTER SCANNER WITH ROTATABLE APERTURE

[75] Inventors: Ellis D. Harris, Claremont, Calif.; Kevin J. Garcia, Tucson, Ariz.

[73] Assignee: Xerox Corporation, Stamford, Conn.

[21] Appl. No.: 214,409

[22] Filed: Mar. 17, 1994

Related U.S. Application Data

[63] Continuation-in-part of Ser. No. 923,639, Aug. 3, 1992, abandoned.
[51] Int. Cl.$^6$ ...................................................... B41J 15/16
[52] U.S. Cl. ......................... 340/100; 347/257; 347/259
[58] Field of Search .................................... 347/251, 256, 347/257, 259; 359/232, 234, 235, 236

[56] References Cited

U.S. PATENT DOCUMENTS 4,560,862  12/1985  Eastman et al. ......................... 235/467
5,208,694  5/1993  Tomita ...................................... 359/216

Primary Examiner—Mark J. Reinhart
Attorney, Agent, or Firm—William Propp

[57] ABSTRACT

A rotatable aperture is positioned between the pre-polygon cross-scan cylindrical optical element and the rotating polygon mirror of a laser diode flying spot raster scanner optical system. Rotating the aperture about a line parallel to the axis in the scan plane adjusts the cross-scan resolution of the imaged spot size along the scan line of the raster output scanner optical system.

9 Claims, 2 Drawing Sheets

MULTIPLE RESOLUTION FLYING SPOT RASTER SCANNER WITH ROTATABLE APERTURE

This is a continuation in part of application Ser. No. 07/923,639, filed Aug. 3, 1992 abandoned.

BACKGROUND OF THE INVENTION

This invention relates to a flying spot raster scanner, and, more particularly, to a rotatable aperture for a flying spot raster scanner optical system which adjusts the resolution along the scan line in the scan and cross-scan axes by adjusting the size of the imaged spot or pixel along the scan line.

Flying spot raster scanners contained in the prior art have a light source, such as a laser, which emits a coherent light beam. The light is collimated in both the scan or tangential axis and in the cross-scan or sagittal axis by multiple optical elements. The collimated light is focused in the cross-scan plane by a cylindrical optical element at a point near a facet of a rotating polygon mirror while remaining collimated in the scan plane.

The light is reflected from the facet and this reflected light revolves about an axis near the center of rotation of the rotating polygon mirror. The reflected, rotating light is focussed in the scan plane by spherical lenses and a cylindrical wobble correction mirror to scan along a line. This reflected light can be utilized to scan a document at the input end of an imaging system as a raster input scanner or can be used to impinge upon a photosensitive medium, such as a xerographic drum, in the output mode as a raster output scanner.

The imaged spots or pixels extend along the scan line. Adjusting the pixels in the scan axis will change the width of the pixels and thus altering the number of spots per inch resolution along the scan line. Adjusting the imaged pixels in the cross-scan axis will change the height of the pixels and thus alter the number of scan lines per inch along the perpendicular to the scan line.

The number of pixels per inch along a scan line and the number of scans per inch are set by the optical scanning system parameters.

The spot sizes at the scan line are fixed in the cross-scan or sagittal axis but can be varied in the scan or tangential axis. If the raster output scanner optical system is required to change resolutions in the cross-scan axis, it is most commonly done by switching a new cylindrical optical element into the beam's path before the polygon mirror while withdrawing the previous cross-scan focussing cylindrical optical element. This optical element replacement requires a complicated and precision mechanical assembly to accomplish this task.

Raster scanners, both input and output, currently available on the market offer a single resolution for printing. The most common resolutions are 240, 300, 400, 480 and 600 spots per inch (spi). The machine resolution is driven not only by the market need of the scanners, but by the required performance for the scanners, by the cost of the scanners and also by corporate strategy. For example, IBM Corporation uses a 240 and 480 spi resolution standard while Xerox Corporation uses a 300 and 400 spi resolution standard. Therefore, interchangeability between scanners with different printing resolutions becomes a problem.

Historically, the interchangeability problem was solved by using software interpolation programs to convert from one resolution to another. However, these software programs allow adjustable resolution in the scan axis only. It is desirable from a cost and customer satisfaction point of view to be able to adjust the resolution in both the scan and cross-scan axes. As performance requirements for the raster scanner change causing the number of scans per inch to change, the sagittal optical spot size or scan lines per inch must be adjusted. In this fashion, only limited software and hardware would be needed to interconnect raster output scanners with different resolutions.

It is an object of this invention to provide mechanical means to adjust the resolution of a flying spot raster scanner along the scan line in both the scan and cross- scan axes.

SUMMARY OF THE INVENTION

In accordance with the present invention, a rotatable aperture is positioned between the pre-polygon cross-scan cylindrical optical element and the rotating polygon mirror of a laser diode flying spot raster scanner optical system. Rotating the aperture about a line parallel to the axis in the scan plane adjusts the cross-scan resolution of the imaged spot size along the scan line of the raster output scanner optical system.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
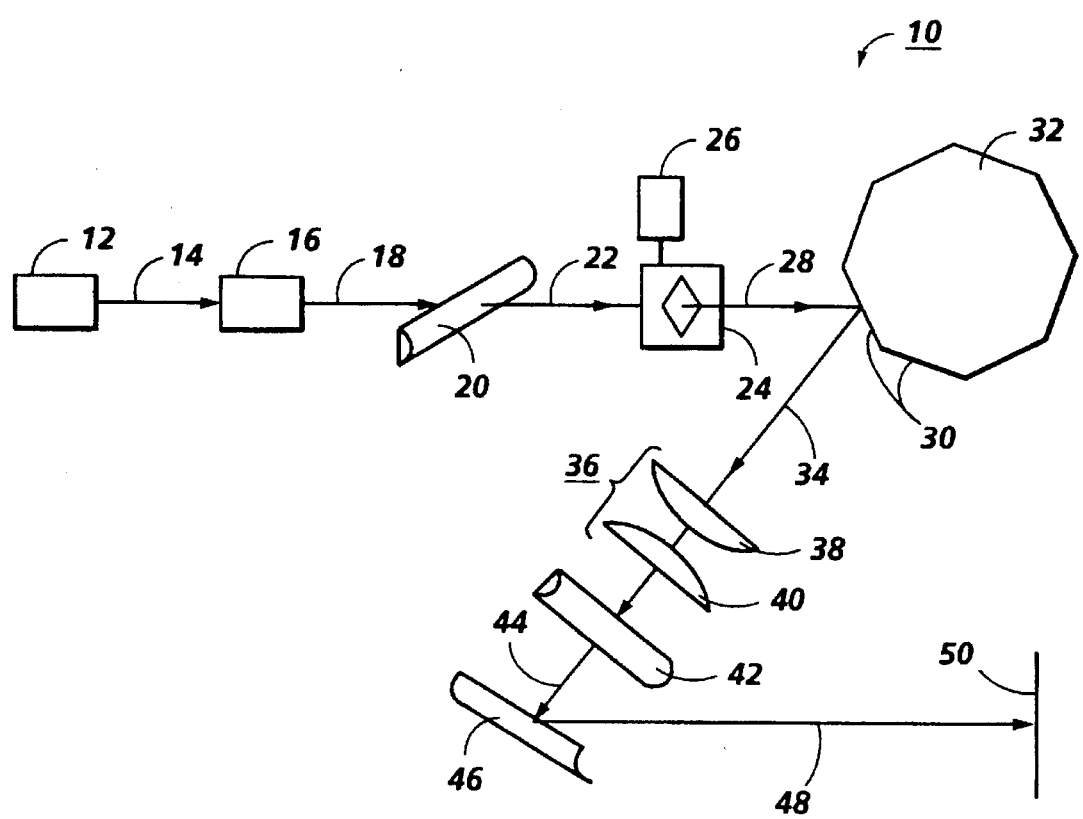
FIG. 1 is a schematic illustration of the cross-section side view of the flying spot raster scanner optical system with a rotatable aperture for adjusting the spot size along the scan line in the scan and cross-scan axes, formed according to the present invention.

Reference is now made to FIG. 1 wherein there is disclosed a flying spot raster scanning optical system 10. A laser diode light source 12 emits a coherent light beam 14 which is collimated in both the scan and cross-scan planes by a multi-element optical collimator 16. The resulting collimated beam 18 passes through a cross-scan cylindrical lens 20. The lens 20 is cylindrical in the cross-scan plane and plano in the scan plane. Thus, the lens converges the cross-scan portion of the beam while maintaining the collimation of the scan portion of the beam.

The cross-scan plane converging, scan plane collimated beam 22 then passes through a rotatable aperture 24 which may selectively block or vignette the outer regions of the beam 22. The aperture 24 is rotated by a solenoid 26.

The apertured beam 28 is still converging in the cross-scan plane from the cross-scan cylindrical lens 20 which focuses the beam on a facet 30 of a multi-faceted rotating polygon mirror 32 while the scan plane portion of the beam 28 remains collimated when the beam strikes the facet.

The beam 34 reflected from the facet 30 is still collimated in the scan plane and is now diverging in the cross-scan plane. The reflected beam 34 then passes through an f-theta scan lens 36 consisting of a negative plano-spherical lens 38 and a positive plano-spherical lens 40. This f-theta scan lens configuration converges the beam in the scan or tangential axis. The beam then passes through a cross-scan cylindrical lens 42.

The lens 42 is cylindrical in the cross-scan plane and plano in the scan plane. The cross-scan cylindrical lens aids the f-theta lens in producing a field in the scan plane. Thus the f-theta scan lens together with the cross-scan cylindrical lens produces a linear, flat-field scan beam. The f-theta lens should be designed with the cross-scan cylindrical lens 42 because the cross-scan cylindrical lens may contribute a small, but non-negligible, amount of distortion, especially at large scan angles.

After passing through the cross-scan cylindrical lens 42, the beam 44 is then reflected off a cylindrical wobble correction mirror 46. The mirror 46 is positive and cylindrical in the cross-scan plane and flat in the scan plane. Thus, the wobble mirror converges the previously diverging cross-scan portion of the beam 44 but allows the converging cross-scan portion of the beam 44 focused by the lens 36 to pass through uneffected.

The reflected beam 48 is focussed onto a photoreceptor or a scan line 50 by the mirror 46 which converges the cross-scan portion of the beam 48 and by the lens 42 which converges the scan portion of the beam 48.

The cross-scan cylindrical lens 20 and the rotatable aperture 24 of the raster output scanner system 10 are utilized to change the light beam spot size of the raster scanner system in the cross-scan or sagittal axis. The aperture 24 is located between the cylindrical optical element 20 and the polygon mirror 32.

Figure 2A:
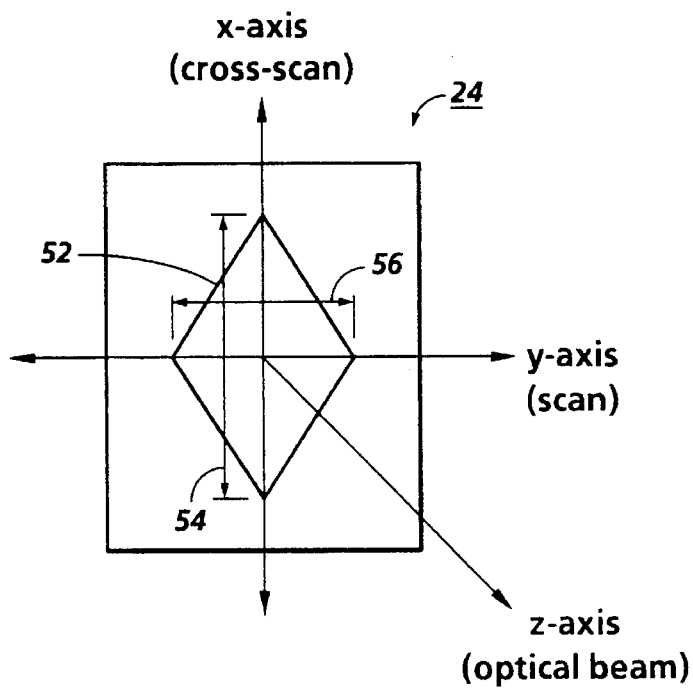
FIGS. 2A, 2B and 2C are schematic illustrations of the rotatable aperture of the flying spot, raster output scanner optical system of FIG. 1 from different perspectives.

The aperture 24 of FIG. 1 requires a rotationally symmetric geometry. As shown in FIG. 2A, the aperture has a diamond-shaped opening 52 with a major axis 54 and a minor axis 56. In this illustrative example, the cross-scan or sagittal axis is along the x-axis. The major axis of the diamond-shaped aperture is along the x-axis. The scan or tangential axis is along the y-axis. The minor axis of the diamond-shaped aperture is along the y-axis. The optical axis of the beam is along the z-axis.

The aperture is rotated about a line parallel to the y-axis in the scan plane for flying spot raster scanning systems which require a spot size change in the cross-scan axis. In order to prevent a spot size change in the scan axis, the aperture must be rotationally symmetric about this scan axis. The laser diode on-time can be controlled to change spot size in the scan axis.

The diamond-shaped aperture 24 has the required rotationally symmetric geometry. Other geometries, such as an ellipse or hexagon, with similar rotational symmetries would be suitable for the aperture.

Figure 2B:
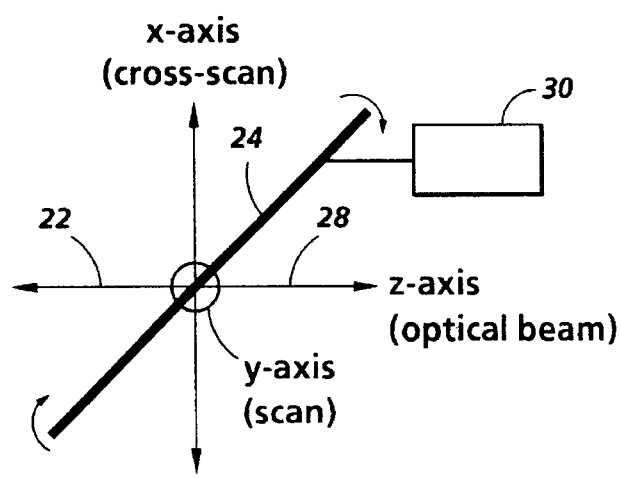
Figure 2C:
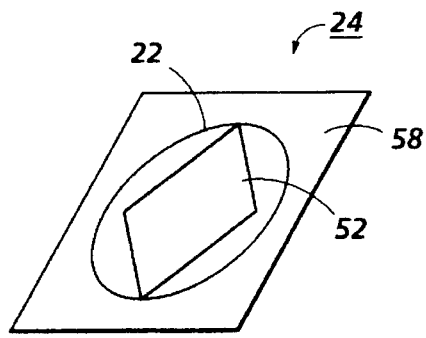

As best seen in FIG. 2B, the aperture 24 can be rotated by the solenoid 30 about a line perpendicular to the scan axis at an angle to the cross-scan axis to vignette beam 22 into beam 28. As shown in FIG. 2C, the rotated aperture 24 presents a smaller cross-section to beam 22 so that selective portions of the beam are blocked by the area 58 surrounding the diamond-shaped opening 52 of the aperture 24. The diamond aperture can be considered the convolution of two rectangular apertures. In the scan axis, the light is a nearly gaussian apodized collimated beam which illuminates the diamond aperture.

This diamond aperture configuration is a Fourier transforming configuration in which the amplitude is the Fourier transform of the illuminated object multiplied by a phase factor. If, in general, the aperture dimension is small compared to the gaussian apodization and the light is collimated, the illumination can be considered nearly planar and the resulting Fourier transform is that of the aperture itself. Thus, the amplitude at the scan line would be the Fourier transform of the convolution of two rectangle functions which are sinc functions multiplied by appropriate phase factors. The resulting irradiance pattern would be proportional to a $sinc^2$ function. The side lobes associated with this type of function are suppressed greatly which results in increased contrast ratio in raster scanner systems.

In the current raster scanner design, the tangential fan of rays are coplanar to the scan plane. When the aperture exceeds the beam size, the irradiance pattern will be that of the raw Gaussian beam and there will be no side lobes. As the aperture is rotated, the beam will be vignetted resulting in a change in spot size at the scan plane, and possibly the introduction of side lobes. The diamond shape will eliminate side lobes as explained above.

The Fourier transforming properties of the rays in the sagittal or cross-scan axis are more complicated. The first transforming configuration is that of an object placed behind the sagittal cylinder plumbing lens element 20. This transform, up to a quadratic phase factor, is the Fourier transform of that portion of the aperture illuminated by the nearly apodized gaussian beam. The image forms the object of the scan lens transform. This computation is actually the convolution of the impulse response of the system with the image predicted by geometrical optics. The impulse response of the system is simply the Fourier transform of the pupil function of the scan lenses in the cross-scan axis. The geometrical image is the perfect image of the object, i.e. no diffraction effects included. The sagittal irradiance pattern, at the photoreceptor plane is numerically determined to be very nearly gaussian in shape.

The use of a rotatable aperture to adjust the resolution of a raster scanning optical system is simply qualitative in nature and is not exact for two major reasons. First, the output from the laser diodes is not a gaussian beam. However, laboratory data indicates that the cross-scan axis is very nearly gaussian, and the scan axis is very nearly gaussian if the aperture stop does not heavily vignette the beam. Therefore, a gaussian beam apodization used to model the system is a valid assumption. Second, it is implicitly assumed that the resolution problem can be separated into orthogonal components and each axis treated separately. This is true in general for symmetric and some asymmetric gaussian beams but not for systems which are coupled. Due to vignetting by the aperture, the beam sizes and apodizations in one axis effect somewhat the optical properties in the other axis and therefore this system is coupled.

As mentioned previously, other aperture geometries could be used in the same rotationally symmetric manner. For example, an elliptical aperture can be considered the convolution of two circular apertures. However, the optical effect this aperture imparts to the beam will be vary somewhat from that of the diamond aperture.

The diamond-shaped aperture was designed into a flying spot raster output scanning system which required switching the sagittal spot size from 400 to 300 spi. The diamond aperture is effectively an object in front of a thin lens with an effective focal length of 329.0 mm, i.e. the scan lenses.

The 400 spi system is modeled first since a larger spot at the aperture becomes a smaller spot at the rotating polygon mirror which is then very nearly imaged to the scan line. A comparably smaller spot at the aperture becomes a larger spot at the rotating polygon mirror which would result in a larger spot at the scan line, the 300 spi resolution.

The theoretical spot size for a 2.4×9 mm diamond-shaped aperture ROS optical system design with 400 spi spot size when the aperture is at zero degrees is 63.5 um (to the $1/e^2$ intensity point) in the cross-scan axis and 44.7 um in the scan axis. When the aperture is rotated 46.5 degrees to obtain the 300 spi spot size, the theoretical spot size is 84.9 um in the cross-scan axis and 45.9 um in the scan axis.

The power loss due to rotating the aperture is approximately 30%. This power loss can be compensated for by increasing the output power of the laser diode initial light source. The focal positions for all cases is within 0.5 mm of the photoreceptor plane.

The invention of the application was reduced to practice to verify the validity of the design. The results show with the aperture at zero degrees for 400 spi, the actual spot size is 65.9 um in the cross-scan axis and 46.6 um in the scan axis. When the aperture is rotated 46.5 degrees to obtain the 300 spi spot size, the actual spot size is 87.6 um in the cross-scan axis and 47.1 um in the scan axis.

The power loss due to the rotating aperture was measured to be approximately 35%. The focal positions were within 0.75 mm of the photoreceptor plane.

The aperture was further rotated to 52.5 degrees which resulted in a spot size equivalent to a 240 spi system resolution with a spot size of 105.2 um in the cross-scan axis and 48.1 um in the scan axis. This further rotation amounted to an additional power loss of 40%.

The long axis of the diamond shaped aperture need not be along the cross-scan axis. The short axis can be along the cross-scan axis so long as rotational symmetry is preserved.

Spot size in the scan axis can be changed by controlling the on-time of the laser diode producing the scan beam. However, alternatively, the aperture can be rotated along the cross-scan axis (the x-axis of FIG. 2) to change the spot size in the scan axis. The aperture can be rotated along both scan and cross-scan axes to change the spot size in both axes along the scan line, adjusting both the length and height of the pixel and thus both the spots per inch resolution and the scans per inch resolution.

The solenoid is not the only means which can be used to rotate the aperture. The aperture can have teeth meshing with the teeth of a motor-driven worm gear. The motor preferably would be a stepping type motor. The aperture also could be rotated manually.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A flying spot raster output scanning optical system for adjusting the resolution of a scan beam along the scan line comprising:

a laser diode source which emits a coherent light beam, collimating means for collimating said emitted light beam, first optical means for converging the cross-scan portion of said collimated beam, a rotatable aperture for selectively blocking said light beam from said first optical beam, means for rotating said rotatable aperture, a rotating polygon mirror with a plurality of facets for reflecting said beam from said rotatable aperture second optical means for converging the scan and cross-scan portions of the reflected beam to form a scan beam along said scan line, whereby said rotatable aperture adjusts the resolution of said scan beam along said scan line.

2. The flying spot raster output scanning optical system for adjusting the resolution of a scan beam along the scan line of claim 1 wherein said rotatable aperture is rotatable about a line parallel to the axis in the scan plane of said flying spot raster output scanning optical system to adjust the cross-scan plane resolution of said scan beam along said scan line.

3. The flying spot raster output scanning optical system for adjusting the resolution of a scan beam along the scan line of claim I wherein said rotatable aperture has a rotational symmetry about said line parallel to the axis in the scan plane of said flying spot raster output scanning optical system.

4. The flying spot raster output scanning optical system for adjusting the resolution of a scan beam along the scan line of claim 3 wherein said rotatable aperture is diamond shaped.

5. The flying spot,raster output scanning optical system for adjusting the resolution of a scan beam along the scan line of claim 3 wherein said rotatable aperture is elliptical shaped.

6. The flying spot raster output scanning optical system for adjusting the resolution of a scan beam along the scan line of claim 1 wherein rotation of said rotatable aperture produces resolutions of 400, 300 or 240 spots per inch.

7. The flying spot raster output scanning optical system for adjusting the resolution of a scan beam along the scan line of claim 1 wherein non-rotation of said rotatable aperture produces resolution of 400 spots per inch, rotation of said rotatable aperture by 46.5 degrees produces resolution of 300 spots per inch, and rotation of said rotatable aperture by 52.5 degrees produces resolution of 240 spots per inch.

8. The flying spot raster output scanning optical system for adjusting the resolution of a scan beam along the scan line of claim 1 wherein said rotatable aperture is rotatable about a line parallel to the axis in the cross-scan plane of said flying spot raster output scanning optical system to adjust the scan plane resolution of said scan beam along said scan line.

9. The flying spot raster output scanning optical system for adjusting the resolution of a scan beam along the scan line of claim 1 wherein said rotatable aperture is rotatable about a line parallel to the axis in the scan plane of said flying spot raster output scanning optical system and is rotatable about a line parallel to the axis in the cross-scan plane of said flying spot raster output scanning optical system to adjust the cross-scan plane and scan plane resolution of said scan beam along said scan line.

\* \* \* \* \*